US008005083B1

(12) United States Patent
Diep

(10) Patent No.: US 8,005,083 B1
(45) Date of Patent: Aug. 23, 2011

(54) APPLYING DIFFERENTIATED SERVICES WITHIN A CABLE NETWORK USING CUSTOMER-AWARE NETWORK ROUTER

(75) Inventor: Timothy Diep, Portsmouth, NH (US)

(73) Assignee: Juniper Networks, Inc., Sunnyvale, CA (US)

( * ) Notice: Subject to any disclaimer, the term of this patent is extended or adjusted under 35 U.S.C. 154(b) by 103 days.

(21) Appl. No.: 12/261,847

(22) Filed: Oct. 30, 2008

(51) Int. Cl.
*H04L 12/28* (2006.01)
(52) U.S. Cl. ........................ 370/389; 725/111
(58) Field of Classification Search .................. 370/389, 370/401; 725/111
See application file for complete search history.

(56) References Cited

U.S. PATENT DOCUMENTS

| 2002/0027596 | A1* | 3/2002 | Roy | 348/14.01 |
| 2007/0030860 | A1* | 2/2007 | Bekele et al. | 370/468 |
| 2007/0110048 | A1* | 5/2007 | Voit et al. | 370/389 |
| 2007/0286393 | A1* | 12/2007 | Roever et al. | 379/221.1 |
| 2008/0025327 | A1* | 1/2008 | Kumar | 370/401 |

OTHER PUBLICATIONS

IPDR, Inc., Network Data Management—Usage (NDM-U) for IP-Based Services Service Specification—Cable Labs® DOCSIS® 2.0 SAMIS, Version 3.5-A.0, Nov. 2004, 42 pgs.
Cable Television Laboratories, Inc., Data-Over-Cable Service Interface Specifications, DOCSIS 2.0, Radio Frequency Interface Specification, CM-SP-RFIv2.0-I13-080215, Chapter 11—Cable Modem CMTS, Copyright 1999-2008, 96 pgs.
Motorola, Broadband Convergence, DOCSIS Cable Modem Connection Process, http://www.jlsnet.co.uk/index.php?page=projects_docsis_biblio, accessed 2003, 67 pgs.

* cited by examiner

*Primary Examiner* — Dang T Ton
*Assistant Examiner* — Wei Zhao
(74) *Attorney, Agent, or Firm* — Shumaker & Sieffert, P.A.

(57) ABSTRACT

In general, techniques are described to increase customer awareness within a network device of a cable network. Based on this increased awareness, a layer 3 network device, such as a router, may apply services that augment services applied by a Cable Modem Termination System (CMTS). The network device may be positioned between the CMTS and a backend network of the cable network. The network device may include a control unit to access the CMTS to determine network information and at least one network interface that receives network traffic. The control unit may apply at least one of a plurality of services provided by the network device to the network traffic based on the network information learned from the CMTS. Often, at least one of the differentiated services may comprise a service not provided by the CMTS and, consequently, a service that may augment those services currently provided by the CMTS.

27 Claims, 7 Drawing Sheets

APPLYING DIFFERENTIATED SERVICES WITHIN A CABLE NETWORK USING CUSTOMER-AWARE NETWORK ROUTER

TECHNICAL FIELD

The invention relates to computer networks and, more particularly, delivery of data services over cable networks.

BACKGROUND

A cable network typically comprises an edge network that couples customer devices to a public network, such as the Internet, via coaxial or other cable. The cable network typically includes a network device referred to as a Cable Modem Termination System (CMTS) to facilitate this access via the coaxial cable. Coupled to one end of the coaxial cable, the CMTS usually resides in a central office and manages cable modems (CMs) coupled to the opposite end of the coaxial cable that reside within the customer's premises. Both the CMTS and the CMs convert data, usually received in packet form, into Radio Frequency (RF) signals for delivery over the coaxial cable, whereupon at either end of the coaxial cable, the CMTS or CMs reconvert the RF signal back into the data packets.

The customers may couple various devices to the CM, which originate the data packets for delivery upstream from the CM to the CMTS via the coaxial cable. In this manner, the customer devices may interface with the public network via the cable network to download and/or upload data or content. The customer devices, which may be referred to herein as Customer Premises Equipment (CPE), may include desktop computers, laptop computers, network-enabled televisions and digital Set-Top Boxes (STBs).

Usually, each customer subscribes to and pays for, as part of the cable data service, a particular level of service, such as a set amount of bandwidth. To provide this level of service, the CMTS may provide, in accordance with a standard referred to as Data Over Cable System Interface Specification (DOCSIS), all subscriber or customer management functions by which to register CMs for operation within the cable network at the corresponding purchased level of service. These customer management functions may include maintaining CM service profiles for each CM that indicate, in part, the level of service provided to traffic originating from a corresponding CM. The CMTS may therefore be considered to "own" this customer management functionality. As a result, the CMTS may represent the only type of network device within conventional cable networks that is "aware" of individual customers, as the CMTS is the only type of network device required by DOCSIS to interface individually with the CMs and associated CPE.

SUMMARY

In general, techniques are described for applying differentiated services with a customer-aware network device, such as a layer three (L3) router deployed within a cable network. The services are "differentiated" in that the services applied by the router can be applied to the network traffic on a customer-specific basis as the router positioned within the cable network is "aware" of the individual subscribers and is able to identify traffic associated with the individual subscribers. Moreover, the services may differ from those typically provided by a Cable Modem Termination System (CMTS). These differentiated services may therefore augment the standard services typically provided by the CMTS such that the router and CMTS may cooperate to facilitate delivery of emerging applications, such as video telephony, web conferencing, and the like, to Customer Premises Equipment (CPE) via the cable network. Cable operators, hesitant to invest additional capital in order to develop advanced CMTSs capable of providing these additional, layer three services, may instead deploy at far less expense customer-aware routers that conform to the principles described herein. Moreover, the customer-aware network devices described herein may be transparent to and interoperable with the CMTS, Cable Modems (CMs), and CPE of conventional cable networks, thereby facilitating deployment of these devices within the cable network as little if any reconfiguration of the CMTS, CMs or CPE may be required prior to deploying the customer-aware network devices.

In operation, an router, for example, may be positioned between a backend network and a CMTS of the cable network. As the CMTS may own (i.e., be entirely responsible for) subscriber management and provisioning, the router may be configured to snoop or otherwise intercept network communications between the CMTS and the backend network in order to extract information relevant to subscriber CMs coupled to the CMTS. The router may, in one instance, snoop or otherwise intercept a Dynamic Host Configuration Protocol (DHCP) request from the CMs to a DHCP server located within the backend network and a corresponding DHCP response from the DHCP service to determine a Media Access Control (MAC) address corresponding to a particular CM, an Internet Protocol (IP) address assigned to the CM, and a location of a CM service, configuration, or parameter file in the backend system. The router may then access the backend network by mimicking a CMTS so as to retrieve the CM configuration file for the corresponding CM. The CM configuration file typically specifies subscriber-specific provisioning information, such as a level of service to be provided by the CMTS to the CM based on any subscriber agreement.

Next, the router determines a mapping between the address assigned to the CM and one or more addresses assigned to any CPE device (e.g., computers, network-ready set-top-boxes and the like) that may be positioned behind the CM. The router may, to determine this mapping, mimic the backend cable network to interrogate or otherwise access the CMTS so as to access an Internet Protocol Detailed Record (IPDR) maintained by the CMTS. Based on this mapping, the router may record an association of the CPE addresses with the CM address in an entry to a table, database or other data structure.

The entry may also store data identifying any differentiated services (e.g., layer three network services) the router is to apply to network traffic received from or destined for the CPE. For each customer, the router may determine which specific differentiated services to apply based on the type and level of service indicated in the CM configuration file for that particular customer as obtained from the backend cable network. In some instances, the IPDR may maintain the type and level of service information, and the router may determine this type and level of service while accessing the IPDR, thereby alleviating the router from having to query the backend for the CM configuration file. Regardless of how the level of service is determined, the router may associate these differentiated services with the CPE by storing these services to the corresponding entry.

To apply these differentiated services indicated in the entry, the router may instantiate a dynamic or logical interface for each CPE address, where the logical interface can be programmed into a forwarding component of the router so that traffic can be forwarded to the logical interface as if the logical interface where a physical, outbound interface. The identified differentiated services for the particular customer are then bound to (i.e., mapped to) the specific logical interface created for the corresponding CPE address. When routing traffic, the forwarding component of the router forwards traffic identifying or otherwise associated with the CPE address to the logical interface. Egress forwarding components within the router apply the services bound to the logical interface as if the logical interface were a conventional, outbound physical interface and redirects the network traffic to an actual, physical interface output the network traffic. In this case, the egress forwarding components of the router look up the entry in the table and apply the services stored in the corresponding entry. In this manner, the router may determine (or become "aware" of) a customer's CM and CPE configuration via interactions with the backend network and CMTS so as to transparently apply differentiated services that may require such awareness, such as a deep packet inspection service, a video conferencing service, a mobile IP service, a packet filtering service, a web conferencing service, or any other enhanced or differentiated service that depends on subscriber or customer awareness.

While described herein with respect to provisioning differentiated services on a per-subscriber basis by mapping CPE addresses to CM addresses, the techniques may be utilized by the network device to determine other types of network information. In the above example, the network device accesses the CMTS to determine the above described mapping by which to provision and then apply the differentiated services. However, the network device may, as another example, access the CMTS to determine a Hybrid Fiber Coaxial (HFC) channel number or HFC serving group to perform a rate limiting or a unique routing service. Moreover, network device may, as yet another example, determine an address assigned to the CMTS and perform the rate limiting or unique routing services based on this information. Thus, while described with respect to a particular type of network information, the network device may implement the techniques described herein to access the CMTS to generally determine network information, such as information describing a current state or connectivity of the network. The network device may then receive traffic and apply the set of differentiated services, e.g., service provisioning, rate limiting and unique routing, based on the network information.

In one embodiment, a method comprising accessing, with a network device positioned between a backend network and a Cable Modem Termination System (CMTS) within a cable network, the CMTS to determine network information concerning a state of the cable network, receiving, with the network device, network traffic, and applying, with the network device, at least one of a plurality of differentiated services provided by the network device to the network traffic based on the network information, wherein at least one of the differentiated services augment services provided by the CMTS.

In another embodiment, a network device positioned between a backend network and a Cable Modem Termination System (CMTS) within a cable network, the network device comprising a control unit that accesses the CMTS to determine network information concerning a state of the cable network, and at least one network interface that receives network traffic, wherein the control unit applies at least one of a plurality of differentiated services provided by the network device to the network traffic based on the network information, and wherein at least one of the differentiated services augment services provided by the CMTS.

In another embodiment, a network system comprising a public network and a cable network. The cable network includes a backend network that includes one or more servers that provide supporting services, a cable modem termination system (CMTS) that couples to at least one cable modem (CM) located at a customer's premises, and a network device positioned between the backend system and the CMTS. The network device couples to the public network and includes a control unit that accesses the CMTS to determine network information concerning a state of the cable network, and at least one network interface that receives network traffic, wherein the control unit applies at least one of a plurality of differentiated services provided by the network device to the network traffic based on the network information, and wherein at least one of the differentiated services augment services provided by the CMTS.

In another embodiment, a computer-readable storage medium comprising instructions for causing a programmable processor to access, with a network device positioned between a backend network and a Cable Modem Termination System (CMTS) within a cable network, the CMTS to determine network information concerning a state of the cable network, receive, with the network device, network traffic, and apply, with the network device, at least one of a plurality of differentiated services provided by the network device to the network traffic based on the network information, wherein at least one of the differentiated services augment services provided by the CMTS.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
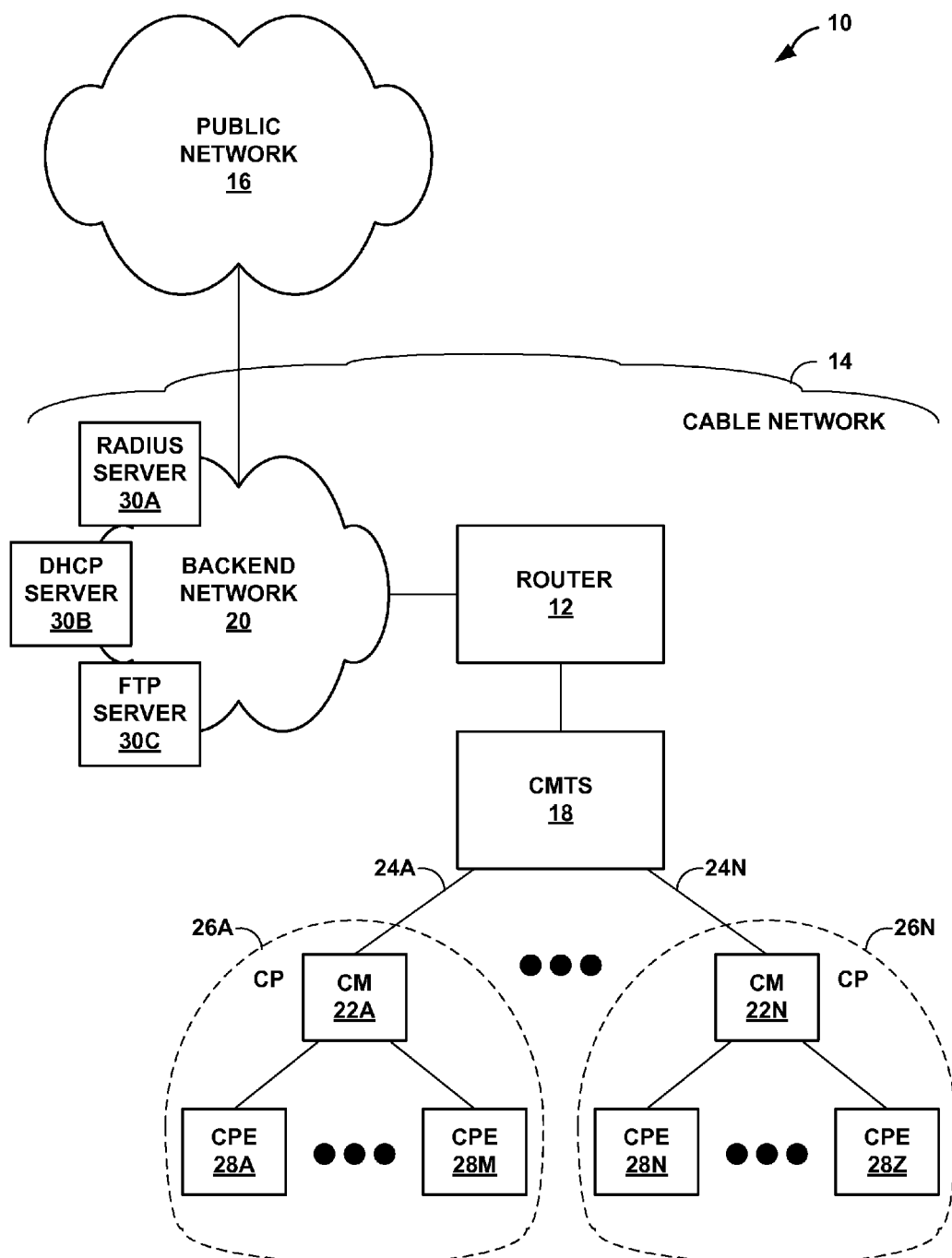
FIG. 1 is a block diagram illustrating an exemplary network system in which a customer-aware router transparently applies differentiated services in accordance with the techniques described herein.

FIG. 1 is a block diagram illustrating an exemplary network system 10 in which a customer-aware router 12 transparently applies differentiated services in accordance with the techniques described herein. Network system 10 includes a cable network 14 that provides data connectivity to a public network 16. Cable network 14 includes router 12, a Cable Modem Termination System 18 ("CMTS 18") and a backend network 20, where router 12 is positioned between CMTS 18 and backend network 20. While described in this disclosure with respect to a router 12, the techniques may be implemented by any network device positioned between a CMTS or similar network device and a backend network that is capable of applying differentiated services to network traffic within a cable network.

While not shown in FIG. 1, cable network 14 may include various infrastructure, such as an office and other buildings, in which router 12, CMTS 18 and backend network 20 may reside. For example, cable network 14 may comprise a central office in which both of router 12 and CMTS 18 reside. As a result, FIG. 1 illustrates router 12 as included within cable network 14, however, router 12 may, in some embodiments, reside in other locations separate from CMTS 18 and backend network 20.

Public network 16 may comprise any publically accessible computer network, such as the Internet. Public network 16 may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection. These devices may be organized into one or more networks, wherein the collection of networks is illustrated in FIG. 1 as a single public network 16. Typically, these devices communicate with one another via a packet-based protocol, such as an Internet Protocol (IP)/Transmission Control Protocol (TCP). As a result, public network 16 may represent or be referred to as a "packet-based" computer network.

Cable network 14 is an edge network, in that cable network 14 resides at the edge of public network 14. Cable network 14 may be referred to as connecting the "last mile" in that cable network 14 provides, manages and/or maintains approximately or loosely the last mile of infrastructure to facilitate access by customers to public network 14. To provide and maintain this access, cable network 14 includes CMTS 18 and backend network 20, where CMTS 18 couple to Cable Modems (CMs) 22A-22N ("CMs 22") via coaxial cables 24A-24N ("coaxial cables 24"). Each of CMs 22 typically resides in a separate customer premises (CP) 26A-26N ("CPs 26") along with respective Customer Premises Equipment (CPE) 28A-28Z ("CPE 28"). One or more of CPE 28 couple to respective CMs 22 via either a wired or wireless connection, where the connection typically occurs via one of the 802.1X family of communication protocols.

CMTS 18 may represent a network device that receives data, often in packet form, from public network 16 and converts the data to a Radio Frequency (RF) signal for transmission over coaxial cables 24. While shown as separate coaxial cables 24 for ease of illustration purposes, CMTS 18 typically couples to a plurality of CMs 22 via a single coaxial cable, such as coaxial cable 24 A. Moreover, while described herein as coaxial cables 24, in some instances coaxial cable only comprise a portion of the link between CMs 22 and CMTS 18, with other transmission mediums, such as fiber optical cable comprising the other portion of the link between CMs 22 and CMTS 18. However, again, for each of illustration, the link between CMTS 18 and CMs 22 may be referred to herein as "coaxial cable." Thus, while CMTS 18 may convert the data received from public network 16 into RF signals, other devices intermediate to CMTS 18 and CMs 22 may further convert the RF signals into other types of signals, such as optical signals.

CMTS 18 may also represent a network device that receives RF signals from downstream CMs 22 and converts these RF signals to data, which may comprise data packets, for transmission upstream to public network 16. "Upstream" communications may refer to communications directed from the edge cable network 14, CPE 28 and CMs 22, upstream through the center of cable network 14, e.g., CMTS 16 and router 12, to public network 16. "Downstream" communications may refer to communications directed from public network 16 downstream through the center of cable network 14, e.g., router 12 and CMTS 18, to the edge of cable network 14, e.g., CMs 22 and CPE 28.

CMTS 18 may further include components so as to provide layer three (3) functions, where "layer three" refers to the network layer of the Open Systems Interconnection (OSI) model. CMTS 18 may further operate in accordance with one of the various versions of a standard referred to as the "Data Over Cable Service Interface Specification" or DOCSIS for short. Each of these versions of DOCSIS, or simply DOCSIS, provides a standard by which cable network 14 may enable customers or, more particularly, CPE 28 to access public network 16 via cable network 14. DOCSIS may, for example, specify the necessary customer management functions cable network 14 need perform to ensure each customer receives a particular level of service to which the customer subscribed. Typically, CMTS 18 provides these customer management functions, relying on support services provided by backend network 20.

Backend network 20 may comprise a sub-network of cable network 14 that includes Remote Authentication Dial-In User Service (RADIUS) server 30A, a Dynamic Host Configuration Protocol (DHCP) server 30B, and a File Transfer Protocol (FTP) server 30C. Network 20 may be referred to as a "backend" network in that it resides at the back-end of cable network 14 transparent to customers 28. Often backend networks, such as backend network 20, provide storage and other resources useful in the operation of a parent network, such as cable network 14.

For example, RADIUS server 30A of backend network 20 may comprise a server that implements the RADIUS protocol by which one or more of network devices included within cable network 14, such as router 12, CMTS 18 and CMs 22, may request authentication to access cable network 14. RADIUS server 30A may maintain authentication information used for authenticating each of these network devices. RADIUS server 30A may therefore provide an authentication support service within cable network 14 to authenticate network devices prior to permitting these devices to access cable network 14.

DHCP server 30B of backend network 20 may comprise a server that implements DHCP by which one or more of the network devices of cable network 14, such as CMs 22 and CPE 28, may request parameters required by the network devices to operate in cable network 14. As cable network 14 typically operates as an Internet Protocol (IP) network, these parameters may include parameters required by the network devices to operate in an IP network, such as cable network 14. These IP parameters may include an IP address and other parameters particular to cable networks, such as a location of a CM configuration file. In this respect, DHCP server 30B may maintain an address space comprised of a plurality of addresses and assign an address (e.g., an IP address) to each network device permitted to access cable network 14. In other words, DHCP server 30B may provide an address resolution and assignment support service that enables each network device of cable network 14 to be individually and distinctly addresses and located within cable network 14.

FTP server 30C of backend network 20 may comprise a server that implements FTP by which one or more of the network devices of cable network 14, such as CMs 22, may request configuration files stored within FTP server 30C. In some instances, FTP server 30C may implement a simplified form of FTP referred to as Trivial FTP or TFTP, and in these instances, FTP server 30C may comprise a TFTP server 30C. The location of the CM configuration file referred to above may represent a filename identifying the CM configuration file, as well as, an address assigned to FTP server 30C. FTP server 30C may therefore represent a server that implements FTP or a variation thereof, such as TFTP, by which CMs 22 request a CM configuration file stored within FTP server 30C. FTP server 30C may, in this respect, provide a remote file storage and retrieval support service useful in registering CMs 22 within cable network 14, as described in more detail below.

CMTS 18 may therefore rely on servers 30A-30C ("server 30") to provide these authentication, address resolution and assignment, and file storage and retrieval supports services in order to manage data services subscribed to be each subscriber/customer. For example, upon powering on, starting up or otherwise activating one of CMs 22, this one of CMs 22 may interact with CMTS 18 to initialize itself within cable network 18. Initialization, according to DOCSIS, may comprise a number of phases, including one or more of 1) a phase concerning scanning and synchronization downstream, 2) a phase concerning obtaining upstream parameters, 3) a phase relating to ranging and automatic adjustments, 4) a phase related to establishing IP connectivity, 5) a phase concerning establishing a time of day, 6) a phase concerning transferring operational parameters, and 7) a phase relating to registration. During the first three phases, the CMTS 18 may generally synchronize the one of CMs 22 to correctly receive downstream traffic and assign a timeslot by which the one of CMs 22 may communicate upstream with CMTS 18, taking into account a range or distance the one of CMs 22 lies from CMTS 18.

The fourth phase related to establishing IP connectivity may comprise the initializing one of CMs 22 issuing a DHCP request that requests an IP address and the location of the CM configuration file associated with the requesting one of CMs 22. CMTS 18 may forward this DHCP request to DHCP server 30B, which may respond with a DHCP response that assigns the one of CMs 22 an IP address from the plurality of addresses included within the address space maintained by DHCP server 30B. The DHCP response may also include a location, e.g., a filename and IP address assigned to FTP server 30C, of a CM configuration file associated with the one of CMs 22. CMTS 18 may maintain a file associated with the one of CMs 22 and update this corresponding file with the association between the MAC address of the one of CMs 22 and the IP address, thereby relying on DHCP server 30B to provide this IP address resolution and assignment service to CMs 22.

In the sixth phase concerning the transfer of parameters, the one of CMs 22 may access the location identified in the DHCP response to retrieve the CM configuration file associated with the one of CMs 22. The one of CMs 22 may issue an FTP, or in some instances a TFTP, request for the identified filename to the IP address assigned to FTP server 30C, for example. CMTS 18 may forward this FTP request to FTP server 30C, which may issue an FTP response that includes the CM configuration file associated with the one of CMs 22 that issued the FTP request. The CM configuration file may include a level of service, such as a bandwidth minimum or Quality of Service (QoS), CMTS 18 provides to the one of CMs 22. CMTS 18 may forward this response to the appropriate one of CMs 22, which may then utilize information in the CM configuration file to register with CMTS 22. CMTS 18 may perform an involved registration process by which CMTS 18, upon successful registration, agrees to provide, to the one of CMs 22, the level of service indicated in the corresponding CM configuration file.

After successful registration, the one of CMs 22 may permit one or more of respective CPE 28 to access cable network 14. To access cable network 14, much like CMs 22, each of respective CPE 28 require an address. Typically, each CPE 28 issues a DHCP request to DHCP server 30B, which responds with a DHCP response assigning an address, such as an IP address, to each of the requesting ones of CPE 28. CMTS 18 may associate each address assigned to one of CPE 28 with an address assigned to the one of CMs 22 within the file maintained for the one of CMs 22. As a result of maintaining this information or association between CMs 22 and corresponding CPE 28 coupled to each of CMs 22, CMTS 18 may be considered customer or subscriber aware.

In accordance with the principles of the invention, router 12 may implement the techniques described herein to determine associations between CM 22 and CPE 28 and thereby become customer aware in addition to CMTS 18. Initially, router 12 may request authentication from RADIUS server 30A. Once authenticated, router 12 may access one or more devices of cable network 14, such as CMTS 18 and FTP server 30C.

Router 12 may then receive network traffic, including the above described DHCP requests that include the MAC address associated with the CMs 22 that issue the request and the corresponding DHCP response that identifies a location of a CM configuration file for the requesting ones of CMs 22. That is, router 12 may transparently intercept both the requests and responses. Based on these DHCP request and responses, router 12 may determine an association between an address assigned to the CM and one or more addresses assigned to customer premise equipment (CPE) coupled to the CM.

For example, router 12 may determine an IP address assigned to a given MAC address associated with each of CMs 22 via the DHCP requests and corresponding responses. Router 12 may next access the file maintained by CMTS 18 for each CM 22 to based on the address assigned to each CM 22. In other words, router 12 may retrieve a file associated with the address assigned to one of CMs 22. By parsing this file, router 12 may determine associations between addresses assigned to CMs 22 and one or more addresses assigned to CPE 28 coupled to each of CMs 22, thereby enabling router 12 to become aware of CPE 28.

Upon determining these associations, router 12 may associate a set of differentiated services provided by router 12 to the one or more addresses assigned to CPE 28, wherein at least one of the differentiated services augment services provided by CMTS 18. Router 12 may determine these differentiated services by accessing FTP server 30C to retrieve the CM configuration file corresponding to each of CMs 22, where, as described above, the CM configuration file identifies a level of service CMTS 18 provides to a corresponding one of CMs 22. Alternatively, router 12 may determine the level of service from the file maintained for the corresponding one of the CMs 22 by CMTS 18. In this instance, router 12 may determine both the association between the one of CMs 22 address and the CPE address and the type and level of service provided by CMTS 18 to that one of CMs 22, thereby alleviating router 12 from having to access backend network 18. Based on the level of service, router 12 may determine the set of differentiated services to apply to traffic originating from CPE 28 coupled to a particular one of CMs 22.

The services are "differentiated" in that the services applied by the router can be applied to the network traffic on a customer-specific basis as the router positioned within the cable network is "aware" of the individual subscribers and is able to identify traffic associated with the individual subscribers. Moreover, the services may differ from those typically provided by a Cable Modem Termination System (CMTS). These differentiated services may therefore augment the standard services typically provided by the CMTS such that the router and CMTS may cooperate to facilitate delivery of emerging applications, such as video telephony, web conferencing, and the like, to Customer Premises Equipment (CPE) via the cable network. Example differentiated services include one or more of a deep packet inspection service, a video conferencing service, a mobile IP service, a packet filtering service, a web conferencing service, and the like.

After determining these differentiated services based on the level of service indicated by the corresponding CM configuration file or file maintained for the CM by CMTS 18, router 12 may associate the determined set of differentiated services by instantiating a dynamic interface for each of the one or more addresses assigned to CPE 28 coupled to a particular one of CM 22s and associating the determined set of differentiated services with each of the dynamic interfaces instantiated for the corresponding one or more addresses assigned to CPE 28 coupled to a particular one of CMs 22. A dynamic or logical interface may comprise a software abstraction that represents a physical interface, hence the name dynamic or logical interface. Router 22 may maintain a plurality of dynamic interfaces, one for each of CPE 28, and associate the determined set of differentiated services to the instantiated dynamic interface for each of CPE 28.

Upon receiving network traffic from one or more CPE 28, router 12 may inspect each packet or data unit of the network traffic for a source and/or destination address and forward the packet to the associated dynamic interface. Router 12 may apply the set of differentiated services associated with the dynamic interface to which the packet was forwarded. Generally, router 12 may, therefore, apply the set of differentiated services to the network traffic associated with the one or more addresses assigned to the CPE by way of the dynamic interface abstraction.

In this manner, router 12 may implement the techniques described herein to increase customer awareness and apply differentiated services that augment standard services conventionally offered by CMTS 18. These differentiated services may therefore augment the standard services typically provided by CMTS 18 such that router 12 and CMTS 18 may cooperate to facilitate delivery of emerging applications, such as Voice over Internet Protocol (VoIP), video telephony, web conferencing, and the like, to Customer Premises Equipment (CPE) via the cable network. Considering the increased customer awareness, router 12 may provision or apply these new or differentiated services on a per-subscriber or more granular basis.

As a result, cable operators, hesitant to invest additional capital in order to develop advanced CMTSs capable of providing these differentiated services, may instead purchase and deploy these customer-aware routers, such as router 12, at far less expense. Moreover, the customer-aware network devices, such as router 12, may be transparent to the CMTS, Cable Modems (CMs), and CPE, thereby facilitating deployment of these devices within the cable network, as little if any reconfiguration of the CMTS, CMs or CPE may be required prior to deploying the customer-aware network devices.

While described above with respect to determining a CM address to CPE address association, such as an association between a MAC address associated with the CM or an IP address assigned to the CM and IP address assigned to CPE coupled to the CM, router 12 may implement the techniques to determine a wide variety of additional information that may enable other services, such as congestion control services, rate limiting services, unique routing services, and the like. CMTS 18 may maintain this additional information within the above described files that CMTS 18 maintains for each CM 22 or in a central database or other data structure. Examples of this additional information may include a Hybrid Fiber Coaxial (HFC) network channel number (or "HFC channel number"), a HFC network serving group (or "HFC serving group"), and IP addresses assigned to CMTS 18.

Based on this additional information, router 12 may dynamically control congestion when a particular HFC channel or serving group or CMTS (assuming router 12 couples to multiple CMTSes) becomes overloaded. Moreover, router 12, again based on the additional information, may implement unique routing protocols for particular subscribers, and therefore the corresponding ones of CPE 28, in a given topology. The techniques therefore should not be limited to the context in which the techniques are described herein but may generally enable a network device to interface with various devices included within a cable network to provide services not commonly provided by a CMTS or other cable network device.

Generally, therefore, router 12, which may comprise, as described below, a layer three (L3) packet-based router, may access CMTS 18 to determine network information. Router 12 may then receive the network traffic associated with cable network 14 and apply at least one of a plurality of services provided by router 12 to the network traffic based on the network information learned from CMTS 18. These services, as described above, may comprise services not applied, available at or even provided by CMTS 18. Consequently, router 12 may facilitate delivery of improved services to customers without requiring costly upgrades to CMTS 18.

Figure 2:
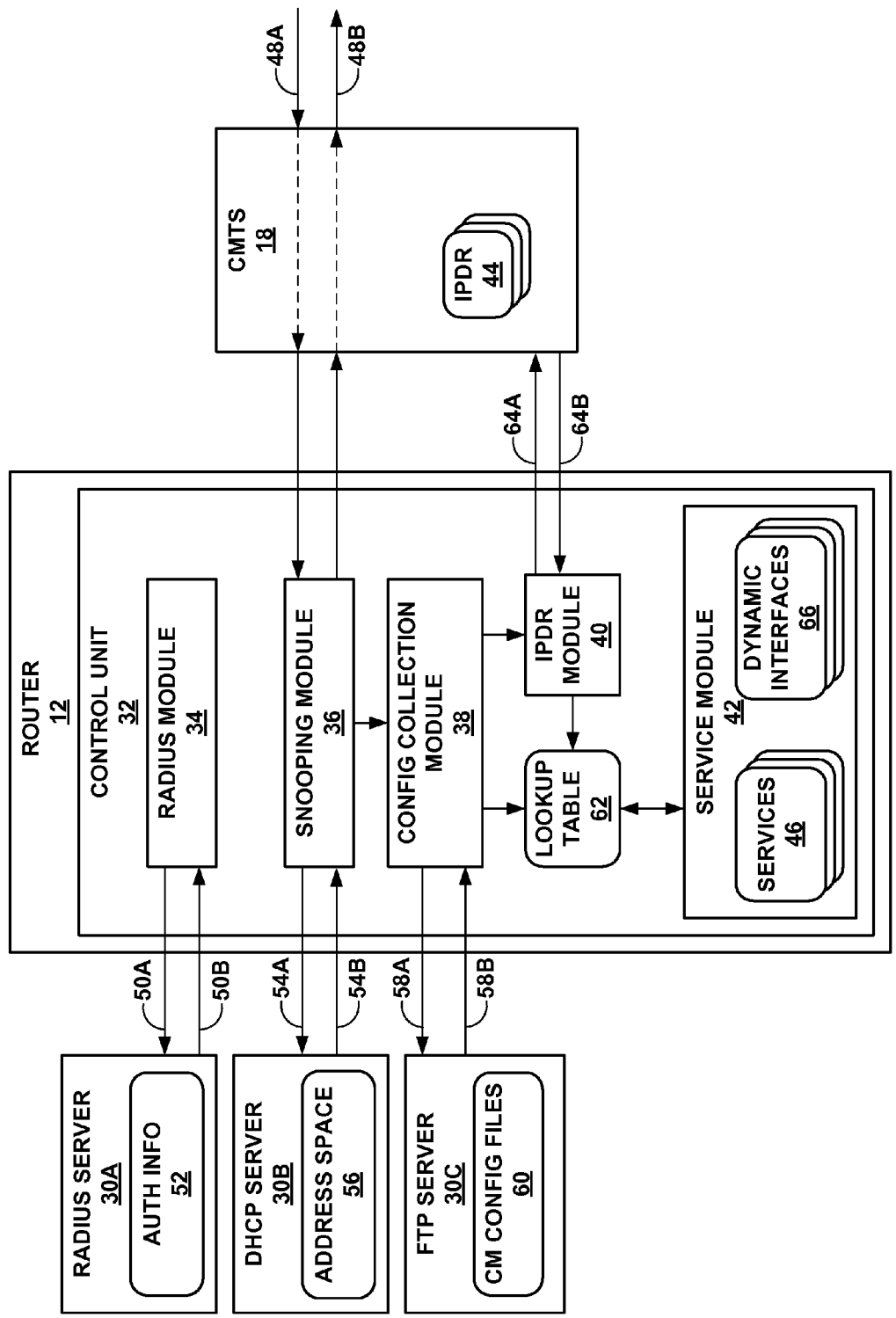
FIG. 2 is a block diagram illustrating a portion of the network system of FIG. 1 in more detail.

FIG. 2 is a block diagram illustrating a portion of network system 10 in more detail. In particular, router 12, CMTS 18 and backend system servers 30 are depicted in more detail in FIG. 2. As shown in FIG. 2, router 12 includes a control unit 32. Control unit 32 may comprise one or more processors (not shown in FIG. 2) that execute software instructions stored to a computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control units 32 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 32 may include a plurality of modules, including a RADIUS protocol module 34 ("RADIUS module 34"), a snooping module 36, a configuration collection module 38 ("config collection module 38"), an Internet Protocol Data Record (IPDR) protocol module 40 ("IPDR module 40"), and a service module 42. RADIUS module 34 may comprise a hardware and/or software module that implements the above described RADIUS protocol by which router 12 secures authentication to access cable network 14, generally, and servers 30 and CMTS 18, more particularly. Snooping module 36 may comprise a hardware and/or software module that transparently intercepts network traffic, including DHCP requests and corresponding DHCP response. In this respect, snooping module 36 may "snoop" or transparently intercept network traffic to determine associations between a CM MAC address and an IP address assigned to the CM identified by the MAC address, as well as, a location of a CM configuration file corresponding to the CM identified by the MAC address.

Configuration collection module 38 may comprise a hardware and/or software module that collects CM configuration files from FTP or other file servers, such as FTP server 30C. IPDR module 40 may comprise a hardware and/or software module that implements the IPDR protocol module by which IPDR module 40 may access the above described files CMTS 18 maintains for each of CMs 22. These files may be referred to as an Internet Protocol Data Record (IPDR), which FIG. 2 illustrates as IPDRs 44. Service module 42 may comprise a hardware and/or software module that applies one or more of differentiated services 46 ("services 46") to upstream network traffic 48A and downstream network traffic 48B.

Initially, RADIUS module 34 may interact with RADIUS server 30A via a RADIUS protocol session to transmit authenticating information via an authentication request 50A to RADIUS server 30A. RADIUS server 30A may receive authentication request 50A and authenticate the authenticating information against authentication information 52 ("auth info 52"). Authenticating information may comprise a username and password, a security key, a token, a certificate or any other type of information commonly used to authenticate a network device, such as router 12. RADIUS server 30A may, based on successful authentication, issue credentials or some other information identifying that router 12 has been properly authenticated via an authentication response 50B. Control unit 32 may utilize these credentials to access servers 30B, 30C of backend network 20 and CMTS 18.

Once authenticated, router 12 may begin receiving both upstream and downstream network traffic 48A, 48B ("network traffic 48"). Snooping module 36 of control unit 32 may intercept particular portions of network traffic 48, such as DHCP requests destined for DHCP server 30B and corresponding DHCP responses originating from DHCP server 30B. Snooping module 36 may therefore implement, at least in part, the DHCP protocol which it may utilize to intercept DHCP requests and responses. Snooping module 36 may, in particular, intercept DHCP requests issued by CMs 22 and DHCP responses corresponding to the DHCP requests issued by CMs 22.

Each of these CM DHCP requests may include an option code field and corresponding option information, where the option code field indicates a type of the corresponding option information. CM DHCP requests may include an option code field set to 60, which may be referred to as "option 60." By setting the option code field to 60, each of CMs 22 may indicate that the corresponding option information specifies a so-called "Vendor Class Identifier." This vendor class identifier may comprise information indicating a version of DOCSIS supported by the requesting one of CMs 22, as well as, capabilities supported by the requesting one of CMs 22. Snooping module 36 may therefore inspect each packet of upstream network traffic 48A to determine whether the packet comprises a DHCP request specifying option 60. If so, snooping module 36 may parse the packet to determine a MAC address associated with the requesting one of CMs 22. That is, the DHCP request may also include a MAC address, which snooping module 36 may snoop and store. Snooping module 36, upon snooping the request or determining the request does not include an option 60, may forward the response to DHCP server 30B as DHCP request 54A.

DHCP server 30B may receive DHCP request 54A and respond with a DHCP response 54B that assigns the requesting one of CMs 22 an address from address space 56 maintained by DHCP server 30b.

Snooping module 36 may also snoop downstream traffic 48B for DHCP responses. In particular, snooping module 36 may intercept DHCP responses included within downstream traffic 48B and inspect or parse the DHCP responses to determine a destination address. If the destination address matches one of the snooped MAC addresses assigned to CMs 22, snooping module 36 may further inspect or parse the DHCP response to determine a location of a CM configuration file. The location, as described above, may comprise an address assigned to a file server, such as FTP server 30C, and a filename identifying the CM configuration file. Snooping module 36 may forward this location to configuration collection module 38.

Upon receiving the location of the CM configuration file, configuration collection module 38 may access the determined location to retrieve the CM configuration file maintained by cable network 14 for the corresponding one of CMs 22. For example, configuration collection module 38 may implement FTP to issue an FTP request 58A to the IP address specified within the location, e.g., FTP server 30C, requesting one of CM configuration files 60 ("CM config files 60") identified by the filename specified again by the determined location. FTP server 30C may receive FTP request 58A and retrieve the one of CM configuration files 60 that corresponds to the filename, whereupon FTP server 30C may respond to request 58A via a FTP response 58A with the retrieved one of CM configuration files 60.

In response to the one of CM configuration files 60, configuration collection module 38 may update a lookup table 62. Lookup table 62 may represent any data structure used for storing data, such as a table or array data structure, a tree data structure, a database data structure, or a linked list data structure. Configuration collection module 38 may parse or otherwise identify a level of service included within the received one of CM configuration files 60 and store this level of service to lookup table 62. Lookup table 62 may comprise an entry for each one of CMs 22 of which router 12 is currently aware. Each entry may be associated with a MAC address associated with and/or an IP address assigned to a corresponding one of CMs 22. In this respect, lookup table 62 may comprise a table by which control unit 32 may look-up information concerning one of CMs 22 based on an address associated with the one of CMs 22. Configuration collection module 38 may therefore create a new entry or edit an existing entry corresponding to the one of CMs 22 for which the CM configuration file corresponds.

For example, snooping module 36 may pass the location to configuration collection module 38 as well as the MAC address associated with the one of CMs 22 for which the location of the corresponding one of CM configuration files 60 is determined. Configuration collection module 38 may retrieve the corresponding one of CM configuration files 60 based on the location as described above and determine a level of service to which a customer and as a result the customer's CM, such as one of CMs 22, subscribed. Configuration collection module 38 may then create a new entry in lookup table 62 for the one of CMs 22 and associate the new entry with the snooped MAC address.

Once defined, configuration collection module 38 may update this entry with the level of service by using the MAC address as a key to retrieve the corresponding CM entry and updating this entry with the level of service. Moreover, configuration collection module 38 may, in some instances not store the level of service to the entry, but an indication of a set of differentiated services 46 that correspond to the level of service. In this respect, configuration collection module 38 may identify which of services 46 to apply to traffic originating from a particular one of CMs 22. However, this level of granularity only enables CM specific application of services 46, which may be inadequate for the above described next-generation IP services, such as Voice over Internet Protocol (VoIP), and the like.

To further resolve the granularity to the CPE level, configuration collection module 38 may pass the snooped MAC address associated with and/or IP address assigned to the one of CMs 22 to IPDR module 40. IPDR module 40, possibly in parallel with the retrieval of the corresponding one of CM configuration files 60, may issue an IPDR request 64A to CMTS 18 requesting one of IPDRs 44 maintained by CMTS 18 that corresponds to either the snooped MAC address associated with or IP address assigned to the one of CMs 22. CMTS 18 may respond with the appropriate one of IPDRs 44 via an IPDR response 64B.

Upon receiving this one of IPDRs 44, IDPR module 40 may parse the one of IPDRs 44 to determine which of CPE 28 couples to the one of CMs 22 identified by the address (either MAC address or IP address). Each of IPDRs 44 may therefore indicate the associations between a respective one of CMs 22 and those of CPE 28 that couple to the respective one of CMs 22. IDPRs 44 may also maintain a wide variety of other network information other than the mapping between the CM MAC address and the IP addresses assigned to CPE 28 coupled to each CM 28 identified by the CM MAC address, such as a Hybrid Fiber Coaxial (HFC) channel number, an HFC serving group, and one or more IP addresses assigned to CMTS 18. In general, this information maintained within IPDRs 44 may be collectively referred to herein as "network information" insomuch as this information defines a state of cable network 14 that router 12 may utilize to apply differentiated services.

With respect to the network information concerning the mapping between a CM MAC address and any CPE IP addresses identifying CPE 28 coupled to the one of CMs 22 associated with the CM MAC address, IPDR 44 may parse this mapping and update the corresponding CM entry within lookup table 62 with the IP addresses assigned to CPE 28 to which the CM couples. With respect to the other information, IDPR module 40 may likewise update CM entries within lookup table 62 with this information. However, as this other information may relate to groups of CMs 22, IPDR module 40 may parse this information and update a plurality of entries within lookup table 62, each of these entries corresponding to one of CMs 22 associated with the group. As CPE 28 may continually be powered on and couple to CMs 22 in an asynchronous manner, IPDR module 40 may routinely or periodically access CMTS 18 to retrieve one or more of IDPRs 44 and update lookup table 62 with the network information.

Regardless of which network information IDPR module 40 parses and associates with CM entries of lookup table 62, service module 42 may apply at least one of the plurality of differentiated services 46 based on this network information stored to lookup table 62. With respect to the network information concerning the mappings between CM MAC addresses and CPE IP address, service module 42 may provision differentiated services on a per-subscriber or per-CPE 28 basis, thereby enabling a per-subscriber service provisioning service of services 44 by which a set of differentiated services may be applied, as described in detail herein.

With respect to network information concerning HFC channel numbers, service module 42 may apply a congestion control service and a unique routing service, both represented as one or more of services 44. The congestion control service may entail rate limiting in response to determining that an HFC channel identified by the HFC channel number has limited bandwidth (e.g., too much traffic flowing through the channel). The unique routing service may entail routing by way of network protocols or services, such as a Multi-Protocol Label Switching (MPLS) protocol, a Virtual Private Large Area Network (LAN) Service (VPLS), and a Multi-Topology Routing (MTR) service.

With respect to network information concerning HFC serving groups, service module 42 may likewise apply a similar congestion control service 44 and/or a similar unique routing service 44. Also, with respect to network information concerning CMTS IP addresses, service module 42 may also apply similar congestion control and unique routing services 44. For purposes of illustration, the techniques are described herein with respect to the per-subscriber service provision service. However, the techniques should not be limited strictly to applying the differentiated services based on the mappings or associations between CM MAC addresses and CPE IP address, but may apply to any network information maintained by a CMTS, such as CMTS 18, and retrieved by a network device, such as router 12.

To continue the example, whereby a set of differentiated services 44 are provisioned on a per-subscriber or CPE basis, service module 42 may access lookup table 62 periodically, or in response to an update by IPDR 40, in order to instantiate, edit, or delete one or more of dynamic interfaces 66. Dynamic interfaces 66 may, as described above, comprise a software construct that logically mimics or represents a physical network interface. One or more dynamic interfaces 66, and often a plurality or set of dynamic interfaces 66, may each execute on a given physical interface (not shown in FIG. 2).

Service module 42 may instantiate a new one of dynamic interfaces 66 in response to an addition of a CPE IP address to a CM entry within lookup table 62. Service module 42 may instantiate the new one of dynamic interfaces 66 to associate the set of differentiated services 46 identified by the entry to the CPE IP address. In this respect, each of dynamic interfaces 66 may comprise a mapping or association between a CPE IP address assigned to a particular one of CPE 28 and a level of service (or set of differentiated services 46) associated with a subscriber's or customer's particular one of CMs 22.

After instantiating or updating dynamic interfaces 66, service module 42 may receive network traffic, such as network traffic 48, via the corresponding one of dynamic interfaces 66. Depending on the set of differentiate services 46 associated with the receiving one of dynamic interfaces 66, service module 42 applies at least one of differentiated services 46 to the network traffic. In this manner, router 12 may provision differentiated services 46 on a per-subscriber basis to facilitate the delivery of next generation IP traffic that corresponds to next generation IP services, such as VoIP, IPTV, and the like.

Figure 3:
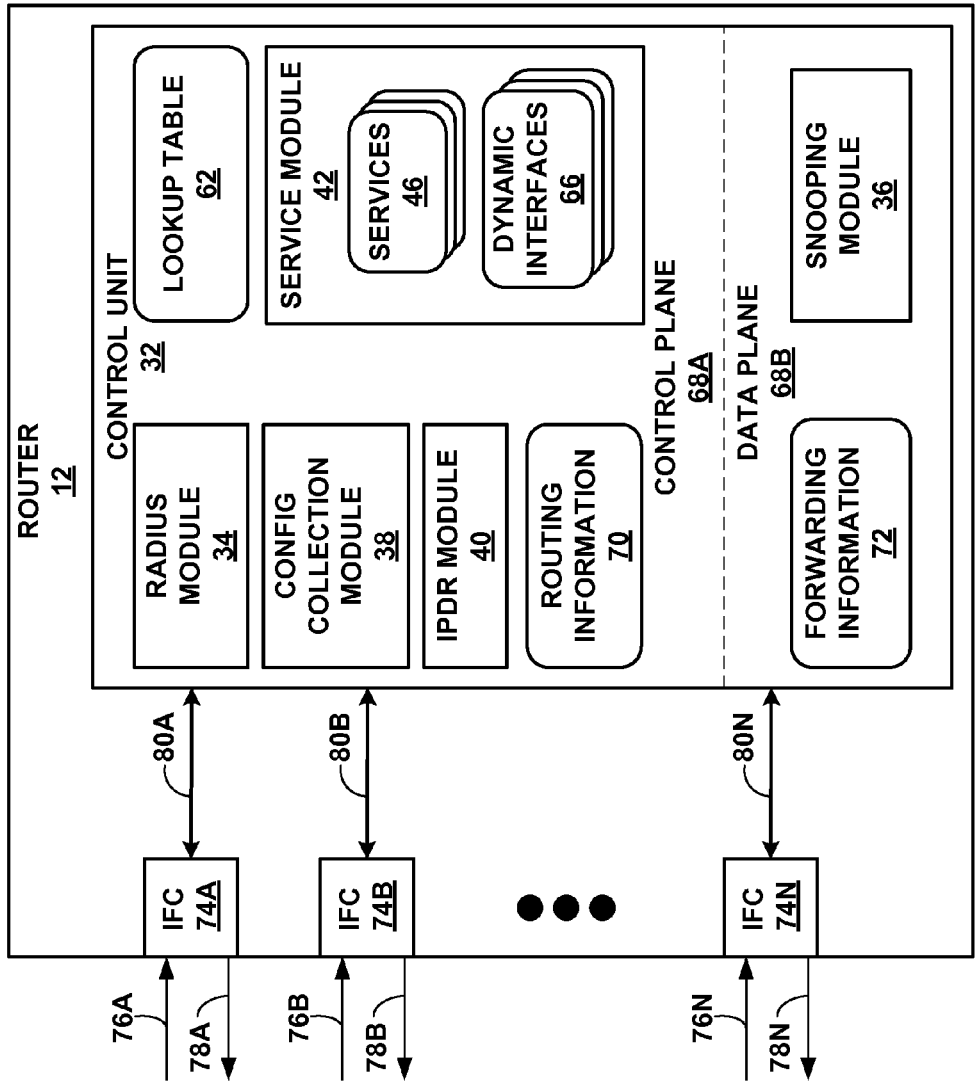
FIG. 3 is a block diagram illustrating an example embodiment of the router of FIG. 2 that implements the techniques described herein.

FIG. 3 is a block diagram illustrating an example embodiment of router 12 of FIG. 2 that implements the techniques described herein. Router 12 may represent any network device that that performs routing functions to route data units through a network. Router 12 may route particular types of data units referred to as packets and as a result may be referred to as a "packet-based router." Moreover, router 12 may implement layer 3 (L3) protocols or network layer protocols (where L3 refers to the L3 of the OSI model, as described above), such as an Internet Protocol (IP), and route packets according to layer 3 information. Consequently, router 12 may also be referred to as a "layer 3 router", a "network layer router" or an "IP router." These descriptive names may be combined such that router 12 may be described as a "layer 3 packet-based router," or any other combination of the above names.

In the example embodiment of FIG. 2, router 12 includes control unit 32 divided into two logical or physical "planes" with a first control or routing plane 68A and a second data or forwarding plane 68B. That is, control unit 32 may implement two separate functionalities, e.g., the routing and forwarding functionalities, either logically, e.g., as separate software instances executing on the same set of hardware components, or physically, e.g., as separate physical dedicated hardware components that either statically implement the functionality in hardware.

Control plane 68A of control unit 32 may execute the routing functionality of router 12. In this respect, control plane 68A may represent hardware and/or software of control unit 32 that implements routing protocols by which routing information 70 may be determined. Routing information 70 may include information defining a topology of a network, such as public network 16. Control plane 68A may resolve the topology defined by routing information 70 to select or determine one or more routes through public network 16. Control plane 68A may then update data plane 68B with these routes, which maintains these routes as forwarding information 72. Forwarding or data plane 68B may represent hardware and/or software of control unit 32 that forwards network traffic in accordance with forwarding information 72.

Control plane 68A may comprise many of the modules described above with respect to FIG. 2, such as RADIUS module 34, configuration collection module 38, IPDR module 40 and service module 42. Data plane 68B may also comprise at least one module described above with respect to FIG. 2, such as snooping module 36. Data plane 68B may also comprise a forwarding component (not shown in FIG. 3) that forwards this network traffic via one or more of InterFace Cards (IFCs) 74A-74N ("IFCs 74").

As further shown in FIG. 3, router 12 includes IFCs 74 that receive and send packet flows or network traffic via inbound network links 76A-76N ("inbound network links 76") and outbound network links 78A-78N ("outbound network links 78"), respectively. IFCs 74 are typically coupled to network links 76, 78 via a number of interface ports (not shown), and forward and receive packets and control information from control unit 32 via a respective one of paths 80A-80N ("paths 80"). Router 12 may include a chassis (not shown in FIG. 3) having a number of slots for receiving a set of cards, including IFCs 74. Each card may be inserted into a corresponding slot of a chassis for communicably coupling the card to a control unit 32 via a bus, backplane, or other electrical communication mechanism.

Initially, router 12 may receive authentication via RADIUS module 34 as described above, whereupon router 12 may receive traffic via inbound network links 76. In particular, IFCs 74 coupled to respective inbound network links 76 may receive the network traffic, whereby each of IFCs 74 forward the network traffic to data plane 68B. Snooping module 36 may then snoop or otherwise perform the operations described above to determine a MAC address associated with one of CMs 22 and a location of a CM configuration file within cable network 14 that defines configuration parameters for the one of CMs 22. Snooping module 36 may the communication this information to control plane 68A and, particularly, configuration collection module 38 of control plane 68A.

Configuration collection module 38 may access FTP server 30C, for example, via one of IFCs 74 and a corresponding one of outbound links 78 to retrieve one of CM configuration files 60 and update lookup table 62, as described above. Configuration collection module 38 or snooping module 36 may further provide the MAC address of the one of CMs 22 to IPDR module 40, which may then access CMTS 18 to determine the network information described above. IPDR module 40 may also update lookup table 62 to reflect the retrieved network information.

Based on this network information, service module 42 may instantiate, update and/or delete dynamic interface 66, also as described above. Service module 42 may also update forwarding information 72 to reflect any changes to dynamic interfaces 66, such that data plane 68B forwards portions of network traffic received via IFCs 74 to one or more of dynamic interfaces 66. Upon receiving this traffic via dynamic interfaces 66, service module 42 may apply a set of differentiated services 46 associated with the one of dynamic interfaces 66 on which the portion of network traffic was received. After applying the set of differentiated services, service module 42 may forward the network traffic back to data plane 68B, which may then forward the network traffic via one of IFCs 74 and outbound network links 78 to a destination indicated by each packet or other data unit of the network traffic. In this manner, router 12 may apply at least one of a plurality of differentiated services 46 to network traffic based on network information retrieved from a CMTS, such as CMTS 18.

Figure 4:
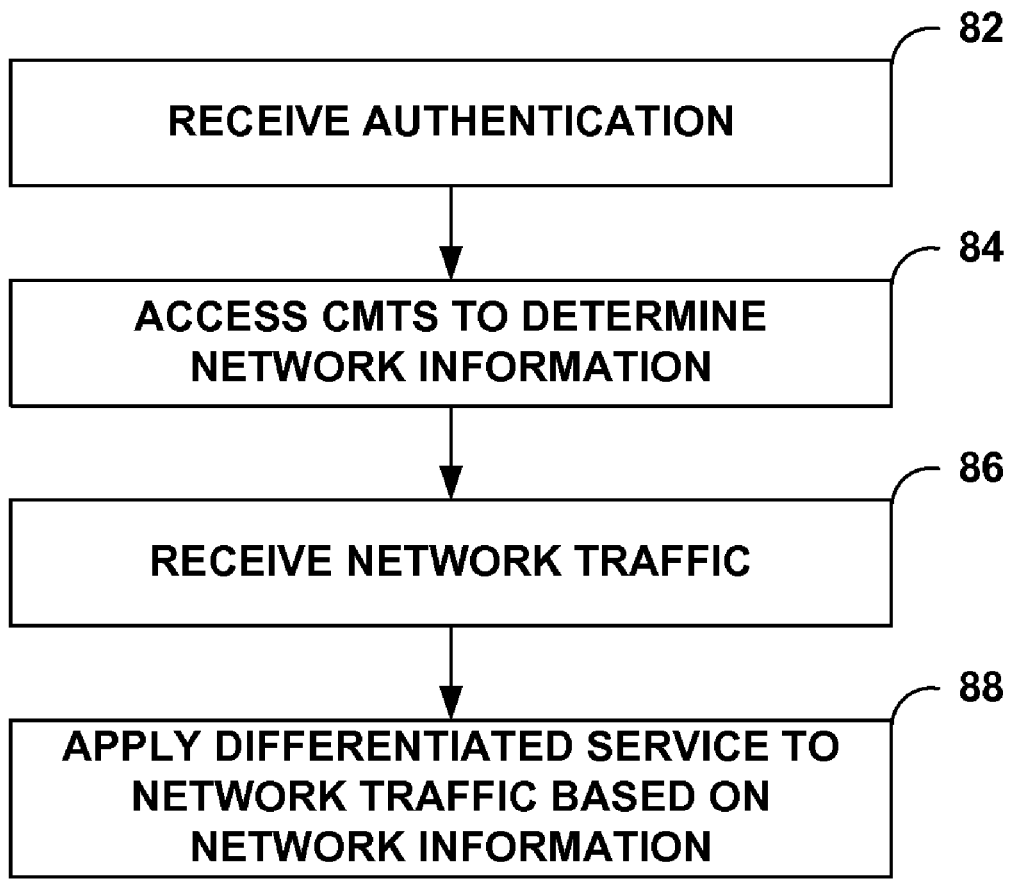
FIG. 4 is a flow chart illustrating example operation of a network device in performing the techniques described herein to apply differentiated services to network traffic.

FIG. 4 is a flow chart illustrating example operation of a network device in performing the techniques described herein to apply differentiated services to network traffic. While described with respect to the network device, router 12, of FIG. 3, the techniques may be implemented by any network device and should not be limited to any one particular type of network device.

Initially, router 12 and, more particularly, a RADIUS module 34 included within control unit 32 of router 12, receives authentication from RADIUS server 30A to access cable network 14 (82). If not authenticated, router 12 may be denied access (by not receiving credentials that must be presented to) CMTS 18. Assuming authentication is received for purposes of illustration, IPDR module 40 of router 12 may access CMTS 18 to determine the above described network information (84).

Meanwhile, router 12 may receive via inbound network links 76 and IFCs 74 network traffic (84). Based on this network information that defines a state of the network (e.g., a mapping between at least one CMs 22 and one or more of CPE 28), service module 42 may apply at least one of the plurality of differentiated services 44 to the network traffic, as described above (86).

Figure 5:
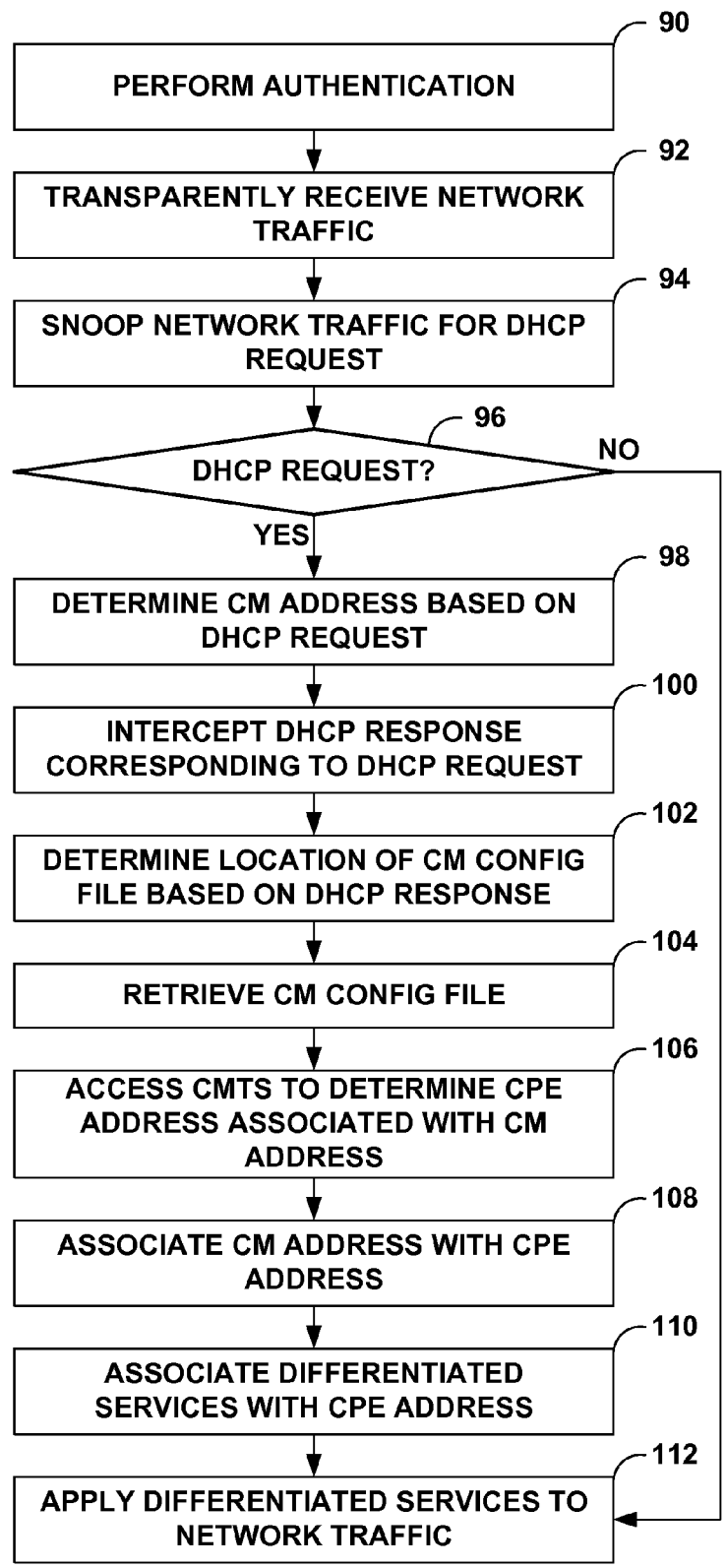
FIG. 5 is a flowchart illustrating exemplary operation of a network device in implementing one aspect of the techniques described herein to perform per subscriber service provisioning.

FIG. 5 is a flowchart illustrating exemplary operation of a network device, such as router 12 as shown in FIG. 2 or 3, in implementing one aspect of the techniques described herein to perform per subscriber service provisioning. With respect to router 12 as shown in FIG. 2, initially, RADIUS module 34 included within control unit 32 of router 12 performs authentication 90, which again is assumed to be successful for purposes of illustration (90).

After receiving this authentication, snooping module 36 of control unit 32 may begin to transparently receive network traffic, such as upstream network traffic 48A, and snoop this upstream network traffic 48A for DHCP requests, as described above (92, 94). If upstream network traffic 48A includes a DHCP request ("YES" 96), snooping module 36 determine a MAC address associated with one of CMs 22, such as CM 22A, based on the DHCP request, as described above (98). Snooping module 36 may also snoop downstream network traffic 48B to intercept a DCHP response corresponding to the DHCP request, e.g., a DHCP response directed to the CM MAC address subsequently snooped (100). Snooping module 36 may determine a location of a CM configuration file that defines configuration parameters for CM 22A based on the DHCP response, also as described above (102).

Snooping module 36 may forward both the MAC address and the location to configuration collection module 38, which may retrieve one of CM configuration files 60 identified by the location and maintained by FTP server 30C, as described above (104). Configuration collection module 38 may update lookup table 62 based on the retrieved one of CM configuration files 60 to effectively associate a level of service or a set of differentiated services 44 identified by the level of service with CM 22A. However, this level of granularity may be further refined, as described above.

For example, snooping module 36 or configuration collection module 38 may forward the MAC address to IPDR module 40, whereupon IPDR module 40 may access CMTS 18, or more generally the CMTS to which the CM identified by the CM MAC address couples, to determine CPE addresses associated with the CM MAC address (106). In this example, IDPR module 40 may determine IP address assigned to CPE 28A-28M, each of which couple to CM 22A associated with the CM MAC address determined from the DHCP request. IDPR module 40 may update lookup table 62 with the CPE addresses, as described above.

Upon updating lookup table 62, service module 42 may associate the set of differentiated services 44 with each of the CPE addresses by way of dynamic interfaces 66, as described above (110). In this manner, router 12 may implement one aspect of the techniques to provision differentiated services on a per-subscriber basis. Upon receiving network traffic (that is not a DHCP request, "NO" 96) via one of dynamic interfaces 66, service module 42 may apply the set of differentiated services 44 associated with the particular one of dynamic interfaces 66 by which the network traffic was received (112).

Figure 6:
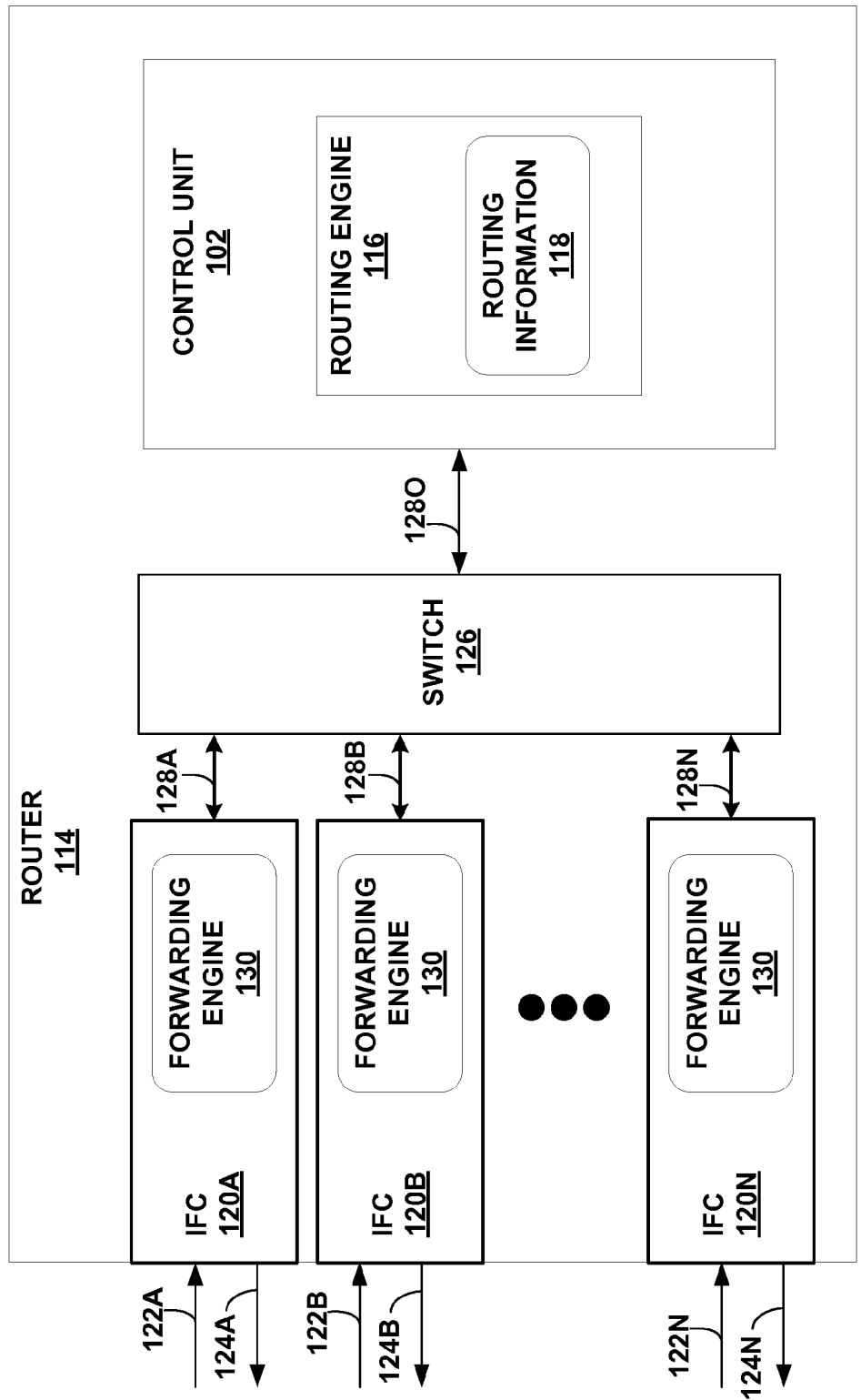
FIG. 6 is a block diagram showing another exemplary embodiment of an router that implements the techniques described herein.

FIG. 6 is a block diagram showing another exemplary embodiment of an router 114 that implements the techniques described herein. Router 114 includes a routing engine 116 that maintains routing information 118 that describes the topology of a network. Routing engine 116 analyzes stored routing information 118 and generates forwarding information (not shown) for interface cards interface cards 120A-120N ("IFCs 120"). In other words, in contrast to the exemplary router 12 of FIG. 3, router 114 does not include centralized forwarding hardware. In particular, router 114 distributes the forwarding functionality to IFCs 120.

IFCs 120 receive and send packet flows via inbound and outbound network links 122A-122N ("inbound network links 122") and 124A-124N ("outbound network links 124"), respectively and are interconnected by a high-speed switch 126 and links 128A-128O ("links 128"). In one example, switch 128 comprises switch fabric, switchgear, a configurable network switch or hub, and the like. Links 128 comprise any form of communication path, such as electrical paths within an integrated circuit, external data busses, optical links, network connections, wireless connections, and the like. IFCs 120 are coupled to network links 122, 124 via a number of interface ports (not shown). Each of IFCs 120 comprises a forwarding engine 130 that forwards packets in accordance with forwarding information generated by routing engine 118.

Each of forwarding engines 130 may include modules and information similar to that of data plane 68B of FIG. 3, while routing engine 118 may include modules and information similar to that of control plane 68A. In this respect, each of forwarding engines 130 of IFCs 120 may snoop or inspect packets arriving via inbound network links 122 using a snooping module similar to snooping module 36. Each of forwarding engines 130 may then forward snooped packets or data units to routing engine 118 so that routing engine 118 may perform the techniques described above to facilitate customer or subscriber awareness.

Figure 7:
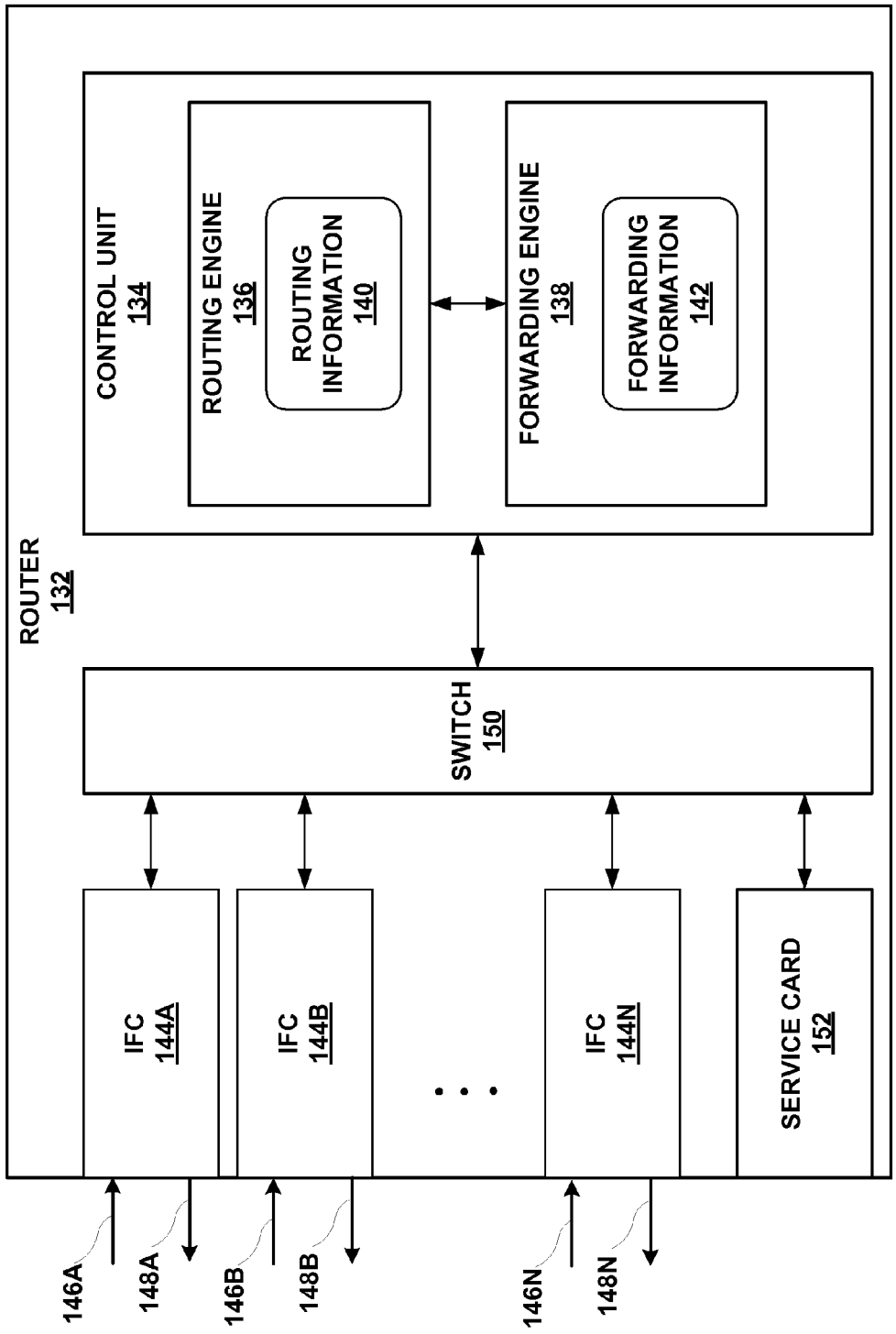
FIG. 7 is block diagram of yet another example embodiment of an router that implements the techniques described herein.

FIG. 7 is block diagram of yet another example embodiment of an edge router 132 that implements the techniques described herein. Although described with respect to router 132, any network device, such as a hub, switch, et cetera may implement the techniques described herein and the principles of the invention should not be limited to this exemplary embodiment.

As shown in FIG. 7, router 132 includes a control unit 134 that comprises a routing engine 136 and a forwarding engine 138. Routing engine 136 is primarily responsible for maintaining routing information 140 to reflect the current topology of a network and other network entities to which it is connected. In particular, routing engine 136, as described above, updates routing information 140 to accurately reflect the topology of the network and other entities. In accordance with routing information 140, forwarding engine 138 maintains forwarding information 142 that associates network destinations with specific next hops and corresponding interfaces ports, also as described above.

Router 132 includes a set of interface cards (IFCs) 144A-144N ("IFCs 144") for communicating packets via inbound links 146A-146N ("inbound links 146") and outbound links 148A-148N ("outbound links 148"). Each of IFCs 144 couple to and communicate with control unit 134 via switch 150. Switch 160 may, as described above, comprise any communication medium capable of communicatively coupling one or more endpoints, e.g., IFCs 144, control unit 134, and a service card 152. Forwarding engine 138 may receive packet forwarded via switch 1150 from IFCs 144 and forward those packets via switch 150 and IFCs 144 on outbound links 148 according to forwarding information 142. In this manner, forwarding engine 138 provides the forwarding functionality of router 132.

Router 86 also includes a service card 152, which may include a control unit that comprises substantially the modules and information related to the techniques described herein as control unit 32 of FIG. 2. In this respect, service card 152 may perform the techniques described above with respect to control unit 32 in substantially the same manner as that of control unit 32.

Service card 152 may however not be logically or physically segmented into control and data planes 62. In this regard, service card 152 may differ from client control unit 32 described above. That is, router 132 may receive the packets via incoming links 146, whereupon IFCs 144 may forward those packets via switch 150 to forwarding engine 138. Forwarding engine 138 may maintain information requiring that packets should first be sent to service card 152 prior to forwarding those packets via one of outbound links 148.

Forwarding engine 138 may then forward these packets to service card 152 for processing or servicing in the manner described above. Service card 152 may also access CMTS, such as CMTS 18 of FIG. 2, in accordance with the techniques described herein. After determining the network information, service card 152 may apply the differentiated services in accordance with the techniques described herein and forward the packets back to forwarding engine 138 via switch 150, whereupon forwarding engine 138 forwards the packets via one of outbound links 148.

Service card 152 may therefore comprise any card or other removable processing unit that may be inserted into a slot. Service card 152 may, once inserted into the slot, interface with switch 150, whereby service card 152 may receive, service and forward packets in accordance with the principles of the invention. In this manner, any network device may implement the techniques described herein to improve the efficiency with which network traffic is processed. Various embodiments of the invention have been described. These and other embodiments are within the scope of the following claims.

The invention claimed is:

1. A method comprising:
retrieving, with a layer three (L3) packet-based router positioned between a backend network and a Cable Modem Termination System (CMTS) within a cable network, data from the CMTS that specifies an association between an address assigned to a cable modem (CM) and one or more addresses assigned to customer premise equipment (CPE) coupled to the CM, wherein the CMTS couples to the CM;
receiving, with the router, network traffic associated with the cable network, wherein the network traffic includes a dynamic host configuration protocol (DHCP) request that includes a media access control (MAC) address associated with the CM and a DHCP response addressed to the MAC address included within the DHCP request identifying a network server included within the backend network that stores a CM configuration file associated with the CM;
accessing, with the router, the network server to retrieve the CM configuration file, wherein the CM configuration file identifies a level of service the CMTS provides to the CM;
determining, based on the level of service identified by the CM configuration file, a set of a plurality of customer-specific services provided by the router;
associating, with the router, the set of the plurality of customer-specific services provided by the router to the one or more addresses assigned to the CPE; and
applying, with the router, the set of customer-specific services to the network traffic associated with the one or more addresses assigned to the CPE.

2. The method of claim 1, wherein receiving the network traffic includes receiving the network traffic in a manner transparent to the CMTS, the CM and the CPE.

3. The method of claim 1, wherein associating the set of services includes:
instantiating a dynamic interface for each of the one or more addresses assigned to the CPE; and
associating the set of customer-specific services with each of the dynamic interfaces instantiated for the corresponding one or more addresses assigned to the CPE.

4. The method of claim 3, wherein applying the set of customer-specific services includes:
determining an address associated with the network traffic;
determining, based on the address determined for the network traffic, a corresponding one of the dynamic interfaces by which to forward each of the network traffic; and
applying the set of customer-specific services associated with the determined dynamic interface.

5. The method of claim 1, wherein determining the one or more addresses assigned to the CPE includes:
periodically accessing the CMTS to determine whether any additional addresses assigned to additional CPE have recently coupled to the CM; and
updating a database included within the router with additional associations between the address assigned to the CM and the additional addresses assigned to the additional CPE that recently coupled to the CM.

6. The method of claim 1, wherein determining the one or more addresses assigned to the CPE includes:
parsing a DHCP request originating from the CM to determine a media access control (MAC) address;
parsing a DHCP response addressed to the MAC address determined from the DHCP request that includes an Internet protocol (IP) address assigned to the CM; and
issuing a request in accordance with one of an Internet protocol detailed record (IPDR) protocol to the CMTS requesting the one or more addresses assigned to the CPE coupled to the IP address assigned to the CM.

7. The method of claim 1, wherein applying the set of customer-specific services includes applying one or more of a deep packet inspection service, a video conferencing service, a mobile IP service, a packet filtering service, and a web conferencing service to the network traffic associated with the one or more addresses assigned to the CPE.

8. The method of claim 1, wherein the services include at least one service that is not applied by the CMTS.

9. A layer three (L3) packet-based router positioned between a backend network and a Cable Modem Termination System (CMTS) within a cable network, the router comprising:
at least one network interface that receives network traffic, wherein the network traffic includes a dynamic host configuration protocol (DHCP) request that includes a media access control (MAC) address associated with the CM and a DHCP response addressed to the MAC address included within the DHCP request identifying a network server included within the backend network that stores a CM configuration file associated with the CM,
a control unit that access the CMTS to determine network information,
wherein the control unit includes a configuration collection module that accesses the CMTS to retrieve the CM configuration file, wherein the CM configuration file identifies a level of service the CMTS provides to the CM, and
wherein the control unit further determines, based on the level of service identified by the CM configuration file, a set of a plurality of customer-specific services provided by the router, retrieves data from the CMTS that specifies an association between an address assigned to the CM and one or more addresses assigned to customer premise equipment (CPE) coupled to a cable modem (CM), and associates the set of the plurality of customer specific services provided by the router to the one or more addresses assigned to the CPE, wherein the CMTS couples to the CM and applies the set of customer-specific services to the network traffic associated with the one or more addresses assigned to the CPE.

10. The router of claim 9, wherein the network interface comprises at least one interface card that receives the network traffic in a manner transparent to the CMTS, the CM and the CPE.

11. The router of claim 9, wherein the control unit further instantiates a dynamic interface for each of the one or more addresses assigned to the CPE and associates the set of customer-specific services with each of the dynamic interfaces instantiated for the corresponding one or more addresses assigned to the CPE.

12. The router of claim 11,
wherein the at least one interface card further determines an address associated with the network traffic, and determines, based on the address determined for the network traffic, a corresponding one of the dynamic interfaces by which to forward each of the network traffic, and
wherein the control unit includes a service module that applies the set of customer-specific services associated with the determined dynamic interface.

13. The router of claim 9,
further comprising a database that stores one or more associations between CPE addresses and CM addresses;
wherein the control unit further includes a module that periodically accesses the CMTS to determine whether additional CPE have recently coupled to the CM, and updates that database with additional associations between the address assigned to the CM and additional addresses assigned to the additional CPE that recently coupled to the CM.

14. The router of claim 9, wherein the control unit includes:
a snooping module that parses a Dynamic Host Configuration Protocol (DHCP) request originating from the CM to determine a media access control (MAC) address; and
an Internet Protocol Data Record (IPDR) module that issues a request in accordance with one an IPDR protocol to the CMTS requesting the one or more addresses assigned to the CPE coupled to the MAC address assigned to the CM.

15. The router of claim 9, wherein the control unit includes a service module that applies one or more of a deep packet inspection service, a video conferencing service, a mobile IP service, a packet filtering service, a web conferencing service to the network traffic associated with the one or more addresses assigned to the CPE.

16. The router of claim 9, wherein the services include at least one service that is not applied by the CMTS.

17. The router of claim 9,
wherein the control unit includes a module that accesses the CMTS to determine the network information comprising one or more of a mapping between a Cable Modem (CM) Media Access Control (MAC) address and an Internet Protocol (IP) address assigned to Customer Premise Equipment (CPE) coupled to the CM, a Hybrid Fiber Coaxial (HFC) channel number, a HFC serving group, a level of service, and an IP address assigned to the CMTS, and
wherein the control unit further includes a service module that applies, based on the network information, one or more of a per-subscriber service provisioning service, a congestion control service, and a unique routing service.

18. A network system comprising:
a public network; and
a cable network that includes:
a backend network that includes one or more servers that provide supporting services;
a cable modem termination system (CMTS) that couples to at least one cable modem (CM) located at a customer's premises; and
a layer three (L3) packet-based router positioned between the backend system and the CMTS, wherein the router couples to the public network and includes:
at least one network interface that receives network traffic, wherein the network traffic includes a dynamic host configuration protocol (DHCP) request that includes a media access control (MAC) address associated with the CM and a DHCP response addressed to the MAC address included within the DHCP request identifying a network server included within the backend network that stores a CM configuration file associated with the CM; and
a control unit that includes a configuration collection module that accesses the CMTS to retrieve the CM configuration file, wherein the CM configuration file identifies a level of service the CMTS provides to the CM, and
wherein the control unit further determines, based on the level of service identified by the CM configuration file, a set of a plurality of customer-specific services provided by the router, retrieves data from the CMTS that specifies an association between an address assigned to the CM and one or more addresses assigned to customer premise equipment (CPE) coupled to a cable modem (CM), and associates the set of the plurality of customer specific services provided by the router to the one or more addresses assigned to the CPE, wherein the CMTS couples to the CM and applies the set of customer-specific services to the network traffic associated with the one or more addresses assigned to the CPE.

19. The network system of claim 18, wherein the network interface comprises at least one interface card that receives the network traffic in a manner transparent to the CMTS, the CM and the CPE.

20. The network system of claim 18, wherein the control unit further instantiates a dynamic interface for each of the one or more addresses assigned to the CPE and associates the set of customer-specific services with each of the dynamic interfaces instantiated for the corresponding one or more addresses assigned to the CPE.

21. The network system of claim 20,
wherein the at least one interface card further determines an address associated with the network traffic, and determines, based on the address determined for the network traffic, a corresponding one of the dynamic interfaces by which to forward each of the network traffic, and
wherein the control unit includes a service module that applies the set of customer-specific services associated with the determined dynamic interface.

22. The network system of claim 19,
wherein the router further comprises a database that stores one or more associations between CPE addresses and CM addresses;
wherein the control unit further includes a module that periodically accesses the CMTS to determine whether additional CPE have recently coupled to the CM, and updates that database with additional associations between the address assigned to the CM and additional addresses assigned to the additional CPE that recently coupled to the CM.

23. The network system of claim 19, wherein the control unit includes:
a snooping module that parses a Dynamic Host Configuration Protocol (DHCP) request originating from the CM to determine a media access control (MAC) address; and
an Internet Protocol Data Record (IPDR) module that issues a request in accordance with one an IPDR protocol to the CMTS requesting the one or more addresses assigned to the CPE coupled to the MAC address assigned to the CM.

24. The network system of claim 19, wherein the control unit includes a service module that applies one or more of a deep packet inspection service, a video conferencing service, a mobile IP service, a packet filtering service, a web conferencing service to the network traffic associated with the one or more addresses assigned to the CPE.

25. The network system of claim 18, wherein the services include at least one service that is not applied by the CMTS.

26. The network system of claim 18,
   wherein the control unit includes a module that accesses the CMTS to determine the network information comprising one or more of a mapping between a Cable Modem (CM) Media Access Control (MAC) address and an Internet Protocol (IP) address assigned to Customer Premise Equipment (CPE) coupled to the CM, a Hybrid Fiber Coaxial (HFC) channel number, a HFC serving group, a level of service, and an IP address assigned to the CMTS, and
   wherein the control unit further includes a service module that applies, based on the network information, one or more of a per-subscriber service provisioning service, a congestion control service, and a unique routing service.

27. A non-transitory computer-readable storage medium comprising instructions for causing a programmable processor to:
   retrieve, with a layer three (L3) packet-based router positioned between a backend network and a Cable Modem Termination System (CMTS) within a cable network, data from the CMTS that specifies an association between an address assigned to a cable modem (CM) and one or more addresses assigned to customer premise equipment (CPE) coupled to the CM, wherein the CMTS couples to the CM;
   receive, with the router, network traffic associated with the cable network, wherein the network traffic includes a dynamic host configuration protocol (DHCP) request that includes a media access control (MAC) address associated with the CM and a DHCP response addressed to the MAC address included within the DHCP request identifying a network server included within the backend network that stores a CM configuration file associated with the CM;
   access, with the router, the network server to retrieve the CM configuration file, wherein the CM configuration file identifies a level of service the CMTS provides to the CM;
   determine, based on the level of service identified by the CM configuration file, a set of a plurality of customer-specific services provided by the router;
   associate, with the router, the set of the plurality of customer-specific services provided by the router to the one or more addresses assigned to the CPE; and
   apply, with the router, the set of customer-specific services to the network traffic associated with the one or more addresses assigned to the CPE.

* * * * *